United States Patent Office 3,079,891
Patented Mar. 5, 1963

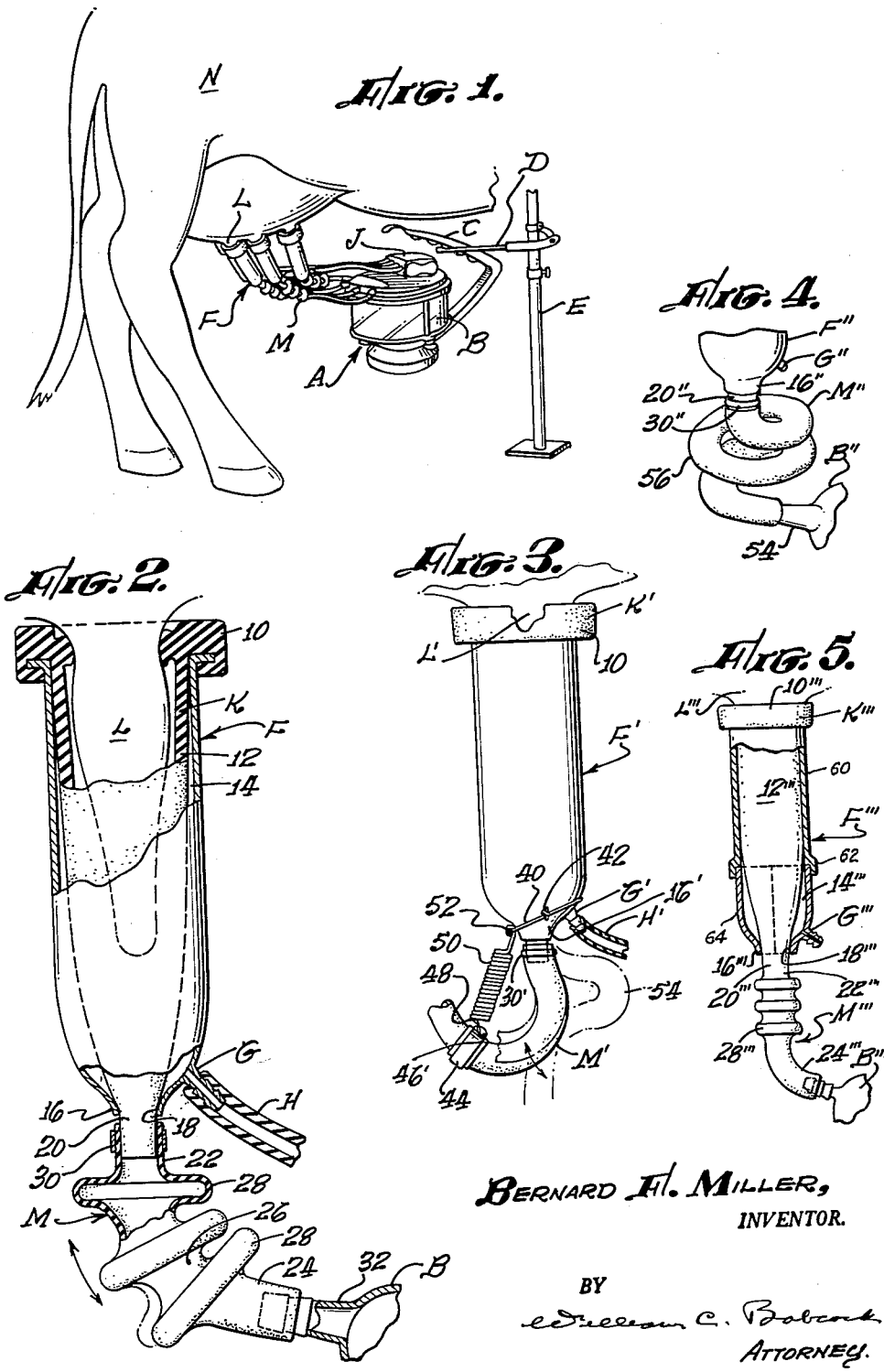

3,079,891
MILKING CUP ASSEMBLY
Bernard F. Miller, 6142 Lorelei, Lakewood, Calif.
Filed July 25, 1960, Ser. No. 44,926
2 Claims. (Cl. 119—14.50)

The present invention relates generally to the field of milking machines, and more particularly to an improved teat cup assembly that minimizes and alleviates the excessive weight on the short teat or quarter during the milking operation, and also provides a milking action which more closely resembles that attainable by manual milking and calf sucking, as nature provided, than heretofore obtainable by mechanical means.

In practically all dairy operations of any substantial size, milking of cows is done by machines, and a number of different types of milking machines have been devised and are currently in use. However, all of these machines have one feature in common in that they include a hollow body from which first flexible tubes lead to cups which are mounted on the cow's teats, with the cups having resilient inflation tubes disposed therein that are periodically expanded on a time cycle by vacuum means. As contraction of the inflation tubes is allowed to take place in timed sequence, milk is forced from the cow's udder and flows to the previously mentioned hollow body through a second set of flexible tubes.

A third flexible tube may be provided for each hollow body and extends therefrom to a header disposed adjacent to the stalls or locations in the shed where the cows are milked. A vacuum is maintained in the header to draw milk upwardly therein from these third tubes. Milk discharged into the header is subsequently withdrawn therefrom into cooling tanks, and thereafter handled in any one of a number of different ways.

The present-day milking machines available heretofore may be of the claw type wherein the hollow body or basket rests on the floor, with first and second flexible tubular members extending upwardly therefrom to the cups and inflation tubes. Due to the fact that the teats of different cows are at different elevations above the floor of the milking areas, and of course, vary in lateral spacing, the udders of some cows are subjected to very substantial forces due to the downward pull of the first tubular members which are of substantially fixed length and relatively inflexible as to longitudinal stretching is concerned.

A second form of milking machine on the current market embodies a hollow receptacle or bucket suspended by a band that encircles the cow, but due to dimensional variations between one cow and another the udders thereof oftentimes are subjected to substantial forces for the same reasons outlined above relative to the first form of apparatus.

A third form of milking machine in common every day use has the hollow receptacle or basket thereof suspended from an upright standard, but in this instance again, due to dimensional variation, the udders may be subjected to substantial forces exerted by the first tubular members.

Excessive downward forces exerted on a cow's udder prevents relaxation of the cow during the milking operation whereby all milk is not withdrawn from the cow, the animal's teats become irritated, and under these conditions the animal frequently contracts mastitis. In all the types of milking machines described hereinabove, the cow's teats are subjected to lateral contraction and expansion only, and not to a subsequent downward pull as occurs during manual milking.

A major object of the present invention is to provide improved teat cup assemblies that subject the quarters of a cow to a uniformly distributed downward pull during the milking operation, subjects the cow's teats to simulated hand-milking action, and more effectively draws all milk from the udder.

Another objects of the invention is to provide an improved milk cup assembly that subjects a cow's teats to a minimum downward force or pull during the milking operation, allows the cow to remain relaxed during the milking operation and substantially lessens the possibility of irritation of the teats or the development of mastitis.

These and other objects of the invention will become apparent from the following description of a preferred form and certain alternate forms thereof as hereinafter described, and as shown in the accompanying drawing in which:

FIGURE 1 is a perspective view of a conventional milking machine provided with the improved cups of the present invention, with the machine and cups being disposed in milking positions on a cow;

FIGURE 2 is an enlarged combined vertical median cross-section and side elevational view of the preferred form of milking cup assembly;

FIGURE 3 is a side elevational view of a first alternate form of the improved milking cup assembly drawn to a reduced scale;

FIGURE 4 is a partial perspective view of a second alternate form of the improved milking cup assembly drawn to a reduced scale; and FIGURE 5 is a combined side elevational and vertical median cross-sectional view of a third alternate form of the invention.

Referring now to the drawing for the general arrangement of the invention, it will be seen that a conventional milking machine A is provided which includes a hollow receptacle B having an angular arm C extending therefrom. The arm C serves to removably support the milking machine A at a desired elevation above the ground surface by engaging a vertically disposed rod D that extends outwardly from a standard E and is vertically adjustable thereon. Milking machine A includes four elongate, rigid cups or shells F, one of which is shown in detail in FIGURE 2, with each cup having a tubular boss G projecting from the lower end portion thereof that is connected by a resilient tube H to the upper portion J of milking machine A.

Each of the cups F has a resilient inflation tube K formed of rubber or the like, disposed within the confines thereof. Each tube K includes an upper lip or flange 10 which extends over the upper end of the cup F and a cylindrical body portion 12 of sufficient transverse cross section as to slidably engage a portion L of the cow's udder, as shown in phantom line in FIGURE 2. However, the transverse cross section of the body portion 12 is such that an annulus-shaped space 14 is formed between a substantial portion of the interior surface of the cup F and the exterior surface of the body portion 12. The cup F slopes downwardly and inwardly in the lower portion thereof to define a short, slight tapered neck 16 in which an opening 18 extends therethrough. The lower portion of inflation tube K also tapers downwardly and inwardly to develop into a second neck 20 that extends through opening 18 a substantial distance therebelow. A resilient tubular member M is provided that has two identical, longitudinally spaced cylindrical end portions 22 and 24. A portion 26 of tube M situated between end portions 22 and 24 has a number of convolutions 28 formed therein. The convolutions 28 are in longitudinally spaced relationship. Tubular member M is preferably formed from rubber that is so compounded as to have a Shore hardness of approximately 60 to 65 when cured. End portion 22 is of such interior cross section as to just slidably engage the exterior surface of the second neck 20, and be rigidly and frictionally held thereon by a metal band 30 that extends around the exterior surface of the end portion 22 as shown in FIGURE 2.

When tube K is not expanded by a vacuum it is of such transverse cross section as to exert laterally directed forces on the udder portion L. When a vacuum is formed in space 14 due to withdrawal of air therefrom through tube H, the transverse cross section of tube K is increased, and the force exerted by the tube K on udder portion L is lessened. Formation of a vacuum in space 14 occurs in timed sequence. Each time the vacuum is broken in space 14 by valve means (not shown) in portion J of machine A, the tube K contracts in transverse cross section due to the resiliency of the material defining the same, and the udder portion L in the tube is milked.

After the vacuum in space 14 is broken, a second vacuum is formed in the interior of tube K as air is withdrawn therefrom through the tubular member M due to the operation of the machine A with this second vacuum accelerating the flow of milk from tube K to the machine A. When a vacuum is formed in tube M after each breakage of the vacuum in space 14, the convolutions 28, due to the resiliency of the material forming the same, tend to be drawn toward one another, and a downward pull is given to the udder portion L caused by the lessening of the distance between end portions 22 and 24. This downward pull on udder portion L tends to withdraw all milk therefrom. The convoluted tube M (FIGURE 2) can have the portion 26 thereof elongated substantially, with but a slight additional downward force being exerted on the udder portion L as elongation of the tube takes place. The cow N, due to the above described milking operation, as well as the fact that the udder portion L thereof is subjected to a minimum downward force during the milking operation, is relaxed, and a maximum milk output is obtained as a result thereof.

A first alternate form of the invention is shown in FIGURE 3 with which a cup F' and tube K are utilized that are identical in construction with the cup F and tube K previously described. A resilient tubular member M' is provided that is removably held in communication with a neck 20' of cup K' by a band 30' as shown in FIGURE 3. A ring 40 encircles the lower portion of the cup F' on the external surface thereof. The ring 40 is held in spaced relationship with the external surface of the cup F' by a number of circumferentially spaced projecting members 42, also shown in FIGURE 3.

The tube M' is of uniform transverse cross section and has a cylindrical band 44 that is longitudinally slidable on the exterior surface thereof. The band 44 has an eye 46 formed as a part thereof which is engaged by a hook 48 formed on the lower extremity of a helical spring 50. The upper end portion of spring 50 terminates in a second hook 52 that slidably engages the ring 40. By slidably moving the band 44 along the tubular member M', a portion of the tubular member may be disposed in a U-shaped configuration 54 as shown in FIGURE 3, with the length of the tube between the neck 20 and the tubular boss 32 (not shown) being so regulated that there is no appreciable downward pull on the udder portion L' of the cow other than that due to the weight of the cup F'. The tubular member M' must have sufficient wall thickness and the resiliency of the material from which it is fabricated must be so controlled, that the tubular member does not collapse when a vacuum is placed on the interior thereof.

The first alternate form of the invention operates in the same manner as the preferred form of the assembly, with the exception that there is no downward pull exerted on the udder portion L' of the cow N when the interior of the tubular member M' is subjected to a vacuum as occurs in the preferred form of the invention.

A second alternate form of tubular member M" is shown in FIGURE 4, which tubular member extends between a neck 20" of a tube (not shown) disposed in a cup F" and a tubular boss 54 that extends outwardly from the upper portion of the receptacle B" of milking machine A". The tube M" is formed of a resilient material such as rubber or the like, and includes one or more spirals 56 that permit the distance between neck 20" and boss 54 to vary without any appreciable downward force being exerted on the udder portion L" of the cow, other than that exerted thereon due to the weight of the cup F".

A third alternate form of the invention is shown in FIGURE 5 that is identical to the form thereof shown in FIGURE 2, other than that the tube K and tubular member M are formed as an integral unit. The same identifying numerals are used in FIGURE 5 as used in FIGURE 2 to identify corresponding elements of the invention, but with a triple prime being added to each numeral.

The cup F''' shown in FIGURE 5 is preferably formed with an upper cylindrical section 60 that has a circumferentially extending flange 62 formed on the lower end thereof which slidably and sealingly engages the top part of a lower section 64 that includes the neck 16'''. This construction permits the easy insertion and removal of the combined tube K''' and member M''' into and out of the cup assembly.

The operation of the present invention has been explained in detail, and need not be repeated. The second alternate form of the apparatus, like the first, does not exert any appreciable downward pull on the udder portion L" of the cow when a vacuum is completed on the interior of the tube M".

It will be obvious to those skilled in the art that various changes may be made in the invention without departing from the spirit and scope thereof, and therefore the invention is not limited by that which is shown in the drawing and described in the specification, but only as defined in the appended claims.

I claim:

1. In a milking cup construction, the combination of:
   (a) a resilient inflation tube having a tubular body portion;
   (b) a lower tubular extension formed of a resilient material, which tube and tubular extension each have walls spaced from a contiguous centrally located longitudinal axis, with said extension having longitudinally spaced convolutions of a diameter substantially equal to that of said body portion which define reduced portions of a diameter smaller than said body portion between each convolution; and
   (c) means for maintaining the lower end of said body portion in communication with the upper end of said tubular extension.

2. In a mixing cup construction, the combination of:
   (a) a resilient inflation tube having a tubular body portion; and
   (b) a lower tubular extension formed of a resilient material, which tube and tubular extension each have walls spaced from a contiguous centrally located longitudinal axis, with said extension having longitudinally spaced convolutions of a diameter substantially equal to that of said body portion which define reduced portions of a diameter smaller than said body portion between each convolution, with said tubular body portion and tubular extension being integral.

References Cited in the file of this patent

UNITED STATES PATENTS

| | | |
|---|---|---|
| 543,868 | Hillman et al. | Aug. 6, 1895 |
| 594,860 | Cushman | Dec. 7, 1897 |
| 822,640 | Wade | June 5, 1906 |
| 1,378,683 | Knowles | May 17, 1921 |
| 2,543,162 | Floerke | Feb. 27, 1951 |
| 2,775,224 | Rawson et al. | Dec. 25, 1956 |
| 2,935,042 | Sprague | May 3, 1960 |
| 2,935,964 | Pickavance et al. | May 10, 1960 |
| 2,944,514 | Nesseth | July 12, 1960 |

FOREIGN PATENTS

| | | |
|---|---|---|
| 126,334 | Russia | June 19, 1959 |